United States Patent [19]
Wickramanayke et al.

US005302197A

[11] Patent Number: 5,302,197
[45] Date of Patent: Apr. 12, 1994

[54] INK JET INKS

[75] Inventors: Palitha Wickramanayke, Corvallis, Oreg.; Sheau-Hwa Ma, Chadds Ford, Pa.

[73] Assignee: E. I. Du Pont de Nemours and Company, Wilmington, Del.

[21] Appl. No.: 998,691

[22] Filed: Dec. 30, 1992

[51] Int. Cl.$^5$ ............................................. C09D 11/02
[52] U.S. Cl. ................... 106/22 H; 106/20 R; 106/499; 106/506
[58] Field of Search ............... 106/20 R, 22 H, 23 H, 106/499, 506

[56] References Cited

U.S. PATENT DOCUMENTS

| | | | |
|---|---|---|---|
| 4,627,875 | 12/1986 | Kobayashi et al. | 106/22 H |
| 4,986,850 | 1/1991 | Iwata et al. | 106/22 F |
| 5,108,503 | 4/1992 | Hindagolla et al. | 106/22 H |
| 5,173,112 | 12/1992 | Matrick et al. | 106/22 H |
| 5,180,425 | 1/1993 | Matrick et al. | 106/499 |
| 5,205,861 | 4/1993 | Matrick | 106/22 H |

FOREIGN PATENT DOCUMENTS 10547 3/1987 Japan.

Primary Examiner—Helene Klemanski

[57] ABSTRACT

An aqueous ink jet composition comprising a pigment dispersion, an aqueous carrier medium, and a cosolvent mixture comprising a polyol/alkylene oxide condensate and a cyclic amide derivative have excellent print quality due to high optical density and minimum feathering over a wide range of commercial papers having different properties, dry rapidly by media penetration without excessive loss of image definition, and become 100% waterfast as soon as the inks are dry to the touch.

18 Claims, No Drawings

INK JET INKS

FIELD OF THE INVENTION

This invention relates to aqueous ink compositions for ink jet printers, and more specifically to aqueous pigmented ink jet inks which produce prints of very high quality, dry fast, and become 100% waterfast shortly after printing.

BACKGROUND OF THE INVENTION

Ink jet printing is a non-impact printing process in which droplets of ink are deposited on a substrate such as paper or transparency film in response to an electronic signal. Low cost and high quality of the output, combined with relatively noise free operation, have made ink jet printers a popular option to other types of printers used with computers. In thermal ink jet printing, a resistor element in a chamber is provided with an egress for the ink to enter from a plenum. The plenum is connected to an ink reservoir. A plurality of such resistor elements are arranged in a particular pattern in a print head. Each resistor element is associated with a nozzle in a nozzle plate, through which ink is expelled onto the print medium. The entire assembly of print head and reservoir comprise a thermal ink jet pen.

In operation, each resistor element is connected to a microprocessor, whose signals cause one or more elements to heat up rapidly. The heat creates a vapor bubble in the chamber, which expels ink through the nozzle onto the print medium. Firing of a plurality of such resistor elements in a particular order forms alphanumeric characters, area fills, or other indicia on the print medium.

Both dyes and pigments have been used as ink colorants for ink jet printers. However, dye-based inks generally suffer from deficiencies in water fastness, and lightfastness. Pigments are a preferred alternative to dyes, provided the pigment dispersions can be made stable to flocculation and settling.

Water based pigment dispersions are well known in the art, and have been used commercially for applying films such as paints onto various substrates. They are generally stabilized by ionic or non-ionic dispersants. While the pigments are inherently more lightfast than the dyes, the choice of the dispersant has a direct effect on ink properties such as waterfastness and smear resistance.

Three attributes of ink jet inks of prime importance are 1) print quality they produce, 2) drying rate when placed on the substrate, and 3) reliability. Print quality is mostly determined by factors such as optical density of the print, edge acuity, dot shape, and spray, if any. To a lesser degree, print quality is also determined by the printer mechanics such as resolution, drop volume, drop velocity, and the software controlling the print modes. But, it is the ink/paper interaction that has the dominant influence on print quality. Paper quality varies depending on the manufacturing process. An ink therefore would interact differently with different commercial papers. Inks that produce high print quality independent of the print media are hence highly desirable.

Drying rate, among other factors, determines the printer throughput. Ink jet printer throughput is relatively slow compared to printers using competing technologies. This is mainly due to "slow" drying rate of the ink jet inks. Inks usually dry by two mechanisms: evaporation and penetration. Evaporation is determined by the vehicle vapor pressure, whereas penetration is determined by the interfacial energy between the ink and the paper and the porosity of the paper.

Heating devices may be used to enhance drying. However, this also accelerates solvent evaporation from the nozzles and causes nozzle plugging. Heaters also add to the printer cost. The use of penetrating cosolvents and surfactants as means of improving dry time is well known in the art. However, many known penetrants, such as butyl carbitol, tend to destabilize pigment dispersions; surfactants also destabilize and/or increase feathering, resulting in degraded print quality.

The ink related reliability issues include 1) decap or crusting time which is defined as the time period over which a print head can stay dormant and exposed to the atmosphere without failing to print; 2) drop volume consistency over pen life; 3) compatibility with the print head components; 4) long term storage stability; and 5) robustness towards variable print parameters such as the firing frequency and pulse width.

The three major ink attributes discussed above conflict with each other. For example, methods known to increase drying rates such as the use of volatile cosolvents adversely affect either print quality by causing increased feathering or reliability by adversely affecting the crusting performance. U.S. Pat. No. 4,986,850 teaches that improved print optical density and edge acuity results from the use of up to 4.5% by weight of an alkylene oxide adduct of a polyhydric alcohol in the ink, which increases the viscosity of the ink due to solvent evaporation when printed on the substrate. This approach, however, also results in longer drying times and an increase in ink viscosity in the nozzles during dormant periods, which causes print reliability problems.

Accordingly, a need exists for inks that will produce high optical density, high print quality and permanent prints over a wide range of papers. A need also exists for inks that dry fast, print reliably and are stable for long periods of storage. This invention satisfies these requirements by using a stable pigment dispersion and a cosolvent system which makes the ink penetrate effectively for achieving the required balance between dry time and spreading.

SUMMARY OF THE INVENTION

In accordance with this invention there is provided an aqueous ink jet ink composition comprising:
(a) a pigment dispersion,
(b) an aqueous carrier medium, and
(c) a cosolvent combination comprising:
(i) at least 4.5% by weight based on the total weight of the ink composition of a polyol/alkylene oxide condensate having a solubility in water of at least 4.5% at 25° C. and represented by the formula:
$CH_2O(CH_2CHXO)_aH$

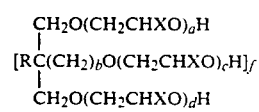

wherein $X = -H$ or $-CH_3$;
$R = -H, -CH_3, -C_2H_5, -C_3H_7, -C_4H_9,$ or $-CH_2O(CH_2CH_2O)_cH$;
$b = 0$ or $1$;

$a + d + f(c + e) = 2 - 100$;
$f = 1 - 6$; and (ii) at least 2% by weight based on the total weight of the ink composition of a cyclic amide derivative having a solubility in water of at least 4.5% at 25° C. and represented by the formula:

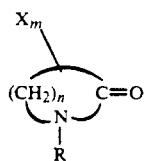

wherein $n = 3-7$, preferably 3-5,
$R = H$, or alkyl group having 1 to 4 carbon atoms, and optionally containing one or more hydroxy or ether groups,
$m = 0-3$,
$X =$ alkyl group having 1 to 4 carbon atoms, and optionally containing one or more hydroxy or ether groups, and wherein X replaces a H on the ring, when $m = 1-3$;
wherein the ratio of (i) to (ii) is in the range from 10:1 to 1:10 by weight, and preferably from 4:1 to 1:4 by weight.

The inks of this invention have the ability to yield excellent print quality due to high optical density and minimum feathering over a wide range of commercial papers having different properties. The inks dry rapidly by media penetration without excessive loss of image definition, and become 100% waterfast as soon as the inks are dry to the touch.

The cosolvent combinations used in the inks are compatible with pigment dispersions in that they do not induce pigment flocculation or settling and are compatible with the components used in the print head. The inks are extremely resistant to crusting problems such as nozzle pluggage and blockage which would arise if the polyol/alkylene oxide condensates were used alone. The combination of cosolvents produces inks having enhanced optical density and print quality as compared to inks using either cosolvent alone.

The inks may be used with a variety of ink jet printers such as continuous, piezoelectric drop-on-demand and thermal or bubble jet drop-on-demand printers, and are particularly adapted for use in thermal ink jet printers.

DETAILED DESCRIPTION OF THE INVENTION

The inks of this invention comprise a pigment dispersion and a novel cosolvent combination in an aqueous carrier medium. The term "pigment dispersion," as used herein, means an aqueous dispersion of pigment particles stabilized by a dispersant, usually a polymeric dispersant. These inks are stable over long periods of time, both in storage and in the printer and may be adapted to the requirements of a particular ink jet printer to provide a balance of viscosity, surface tension, resistance to nozzle pluggage, good print quality, water and smear resistance, and light stability.

PIGMENT DISPERSION

Pigments

A wide variety of organic and inorganic pigments, alone or in combination, may be used in the present inks. The term "pigment" as used herein means a water insoluble colorant. In ink jet inks, the pigment particles need to be sufficiently small to permit free flow of the ink through the ink jet printing device, especially at the ejecting nozzles that usually have diameters ranging from 10 micron to 50 micron. The particle size also has an influence on the pigment dispersion stability and color strength and gloss. The range of useful particle sizes is approximately 0.005 micron to 15 micron. Preferably, the pigment particle size should range from 0.005 to 5 micron, more preferably from 0.005 to 1 micron, and most preferably from 0.005 to 0.3 micron.

The selected pigment may be used in dry or wet form. Representative commercial dry and presscake pigments that may be used in practicing the invention are disclosed in U.S. Pat. No. 5,085,698.

In the case of organic pigments, the ink may contain up to approximately 30% pigment by weight, but will generally be in the range of approximately 1 to 15%, preferably approximately 1 to 8%, by weight of the total ink composition for most thermal ink jet printing applications. If an inorganic pigment is selected, the ink will tend to contain higher weight percentages of the pigment than with comparable inks employing an organic pigment, and may be as high as approximately 50% because inorganic pigments generally have higher specific gravities than organic pigments.

Dispersants

Preferably, the dispersant is a polymeric dispersant. A detailed list of non-polymeric as well as some polymeric dispersants are listed in the section on dispersant, P. 110-129, 1990 McCutcheon's Functional Materials, North American Edition, Manufacturing Confection Publishing Co., Glen Rock, N.J., the disclosure of which is incorporated herein by reference.

Polymeric dispersants suitable for practicing the invention include random, block, and branched-type polymers. The polymer may be anionic, cationic, or nonionic in nature.

Random polymers are not as effective in stabilizing pigment dispersions as the block polymers and, therefore, are not preferred. However, a random polymer which has both hydrophilic segments for aqueous solubility and hydrophobic segments for interaction with pigment and an average molecular weight to contribute to the dispersion stability can be effectively used to practice the present invention. Such polymeric dispersants are disclosed in U.S. Pat. No. 4,597,794, the disclosure of which is incorporated herein by reference.

The block polymers suitable for practicing the invention include AB, BAB, and ABC type structures. A block polymer which has hydrophobic and hydrophilic blocks and balanced block sizes to contribute to the dispersion stability may be advantageously used to practice this invention. Functional groups can be built into the hydrophobic (pigment binding) block for stronger specific interactions between the pigment and the polymer dispersant to give an improved dispersion stability. A detailed description of these polymers can be found in the aforementioned U.S. Pat. No. 5,085,690 and in co-pending applications U.S. Ser. No. 07/839,533 and U.S. Ser. No. 07/838,181, both filed Feb. 20, 1992. The disclosures of these references are incorporated herein in thier entirety.

As mentioned in these references, it may be necessary to make salts of the functional groups contained in the polymer to render it soluble in the aqueous carrier medium.

The amount of polymer depends on the structure, molecular weight, and other properties of the polymer, and upon the other components of the ink composition. The block polymers that are selected in practicing the invention have a number average molecular weight of below 20,000, preferably below 10,000, and typically in the range of 1,500 to 6,000.

The dispersant, preferably a polymer, is present in the range of approximately 0.1 to 25%, preferably 0.1 to about 8%, by weight based on the total weight of the ink composition. If the amount of polymer is too high, it will become difficult to maintain desired ink viscosity. Dispersion stability will be adversely affected if insufficient polymer is present.

AQUEOUS CARRIER MEDIUM

The aqueous carrier medium comprises water (preferably deionized water) or a mixture of water and at least one water soluble organic solvent other than the selected polyol/alkylene oxide condensate and the selected cyclic amide derivative. Representative examples of water-soluble organic solvents are disclosed in the aforementioned U.S. Pat. No. 5,085,698.

Selection of a suitable mixture of water and water soluble organic solvent depends on the requirements of the specific application, such as desired surface tension and viscosity, the selected pigment, drying time of the ink, and the type of substrate onto which the ink will be printed. However, it is very important that the selected water soluble organic solvent does not adversely affect the excellent print quality obtained by using the cosolvent combinations of this invention.

The aqueous carrier medium is present in the ink composition in the range of approximately 65 to 93.5%, preferably approximately 85 to 90% based on the total weight of the ink.

COSOLVENT COMBINATION

The present inks contain a novel cosolvent combination comprising a polyol/alkylene oxide condensate and a cyclic amide derivative.

Polyol/Alkylene Oxide Condensate:

The polyol/alkylene oxide condensate compounds are reaction products of a polyol and an alkylene oxide. They must have a solubility in water of at least 4.5% (i.e., 4.5 parts in 100 parts of water) at 25° C., and are represented by the formula: $CH_2O(CH_2CHXO)_aH$

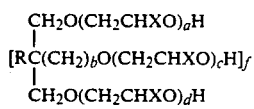

wherein
$X =$ —H or —$CH_3$;
$R =$ —H, —$CH_3$, —$C_2H_5$, —$C_3H_7$, —$C_4H_9$, or —$CH_2O(CH_2CH_2O)_eH$;
$b = 0$ or 1;
$f = 1$–6; and
$a + d + f(c + e) = 2$–100.

The alkylene oxide is either ethylene or propylene oxide or combinations of both oxides. Reaction with a single alkylene oxide can produce mixtures of compounds with varying degrees of oxyalkylation so that the structures illustrated are based on average compositions which may contain a range of alkylene oxide units. Random and block copolymer chains of propylene and ethylene oxides may be employed.

The polyol may contain 3 or more hydroxyl groups. Useful triols used are glycerol, trimethylol propane, and trimethylol ethane. Others such as 1,2,4-butanetriol and 1,2,6-hexanetriol may be useful. Pentaerythritol, di-(trimethylol propane), and methyl glucosides may be useful tetrols. Glucose may be a useful pentol. Sorbitol is a useful hexol. Other hexols that may be useful are dipentaerythritol and inositol. Diols are not particularly suitable for this invention because their alkylene oxide condensates are generally not compatible with pigment dispersions. One exception may be alkylene oxide condensates of neopentyl glycol.

Some examples of polyol/alkylene oxide condensates are as follows:

| Product | R | a + d + f(c + e) | b | f |
|---|---|---|---|---|
| Liponic ® EG-1[1] | —H | 26 | 0 | 1 |
| Liponic ® SO-20[1] | —H | 20 | 0 | 4 |
| Photonol ® PHO-7149[2] | —$C_2H_5$ | 2.7 | 1 | 1 |
| Photonol ® PHO-7155[2] | —$C_2H_5$ | 7.4 | 1 | 1 |
| Voranol ® 230-660[3] | —$CH_3$ | 3.0 | 1 | 1 |
| Voranol ® 234-630[3] | —$C_2H_5$ | 3.0 | 1 | 1 |
| Fomrez ® T-279[4] | —$C_2H_5$ | 3.1 | 1 | 1 |
| Fomrez ® T-315[4] | —$C_2H_5$ | 4.1 | 1 | 1 |

[1] Lipo Chemicals Co., Paterson, NJ
[2] Henkel Corp., Ambler, PA
[3] Dow Chemical Co., Midland, MI
[4] Witco Corp., Organic Division, New York, NY Preferred polyol/alkylene oxide condensates have a degree of oxyalkylation in the range from 2–100 alkylene oxide units. In the case of a triol, a degree of oxyalkylation of 2 means that only 2 of the hydroxyl groups are reacted with the alkylene oxide units. A more preferred range is 10–40 alkylene oxide units. The optimum amount will depend on the number of hydroxyl groups in the polyol. The more of the hydroxyl groups present, the higher is the optimum amount of alkylene oxide units. A discussion of the chemistry of the formation of these compounds is found in R. H. Body and V. L. Kyllingstad, "1,2-Epoxide Polymers" in the *Encyclopedia of Polymer Science and Engineering*, Vol. 6, pp 225–322, 1986, John Wiley, N.Y.

The polyol/alkylene oxide condensate is present in the amount of at least 4.5% based on the total weight of the ink. The upper limit for the amount of this cosolvent is highly dependent on the viscosity characteristics of the cosolvent and the architecture of the print head. Since the polyol/alkylene oxide condensate cosolvents can have a wide range of viscosities, dependent on the degree of oxyalkylation and the degree of branching, it is difficult to conclusively state the maximum amount of this cosolvent which may be present in the ink. For most applications, however, this cosolvent may be used in amounts of 5–25%, more preferably 5–15%, and still more preferably 5–10%, based on the total weight of the ink composition. Mixtures of various polyol/alkylene oxide condensates may also be employed to balance ink properties such as surface tension and viscosity.

Cyclic Amide Derivative

The cyclic amides are powerful solvents for polymers and are commonly used industrial materials. They are non-corrosive, miscible with water, and have good chemical stability. To be useful for this invention, they must have a solubility in water of at least 4.5% at 25° C., and are represented by the formula:

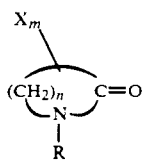

wherein
n=3-7, preferably 3-5,
R=H, or alkyl group having 1 to 4 carbon atoms, and optionally containing one or more hydroxy or ether groups,
m=0-3,
X=alkyl group having 1 to 4 carbon atoms, and optionally containing one or more hydroxy or ether groups, and wherein X replaces a H on the ring, when m=1-3.

Preferred cyclic amides have a ring size in the range from 5 to 9 members. A more preferred range for the ring size is from 5 to 7 members. Examples of cyclic amide derivatives which may be used to advantage include 2-pyrrolidone, 1-methyl-2-pyrrolidone, 1,5-dimethyl-2-pyrrolidone, 1-ethyl-2-pyrrolidone, 1-propyl2-pyrrolidone, 1-isopropyl-2-pyrrolidone, 1-butyl-2-pyrrolidone, 1-(2-hydroxyethyl)-2-pyrrolidone, 1-methyl2-piperidone, valerolactam, 1-ethyl valerolactam, caprolactam, 1-methylcaprolactam and oenantholactam. Most of these materials are commercially available.

The cyclic amide derivative is present in the amount of at least 2%, preferably 2-25%, and more preferably 2-15%, based on the total weight of the ink composition. Mixtures of various cyclic amides may be employed to balance the ink properties such as the surface tension, dry time and viscosity.

In accordance with the present invention, the ratio of the polyol/alkylene oxide condensate cosolvent to the cyclic amide cosolvent needs to be within the range of 1:10 to 10:1, preferably 1:4 to 4:1, by weight for the optimum overall ink performance. Increasing the level of polyol/alkylene oxide condensate cosolvent beyond this ratio results in crusting and nozzle blockage. Increasing the level of cyclic amide beyond this ratio results in a degradation of optical density and edge acuity.

OTHER INGREDIENTS

Consistent with the requirements for this invention, various types of additives can be used to optimize the properties of the ink compositions for specific applications. Surfactants may be used to alter the surface tension as well as maximize the ink penetration. However, the type of the surfactants and the amounts used need to be carefully selected to avoid pigment dispersion destabilization or to negate the benefits of the present inks.

As is well known to those skilled in the art, biocides may be used in the ink composition to inhibit growth of microorganisms, sequestering agents such as EDTA may also be included to eliminate deleterious effects of heavy metal impurities and buffer solutions may be used to control the pH of the ink. Other known additives such as viscosity modifiers and other acrylic or non-acrylic polymers may be added to improve various properties of the ink compositions as desired.

INK PROPERTIES AND PREPARATION

The ink compositions of this invention are prepared in a similar manner as other ink jet inks. The pigment dispersion is first prepared by premixing the selected pigment(s) and the selected polymer in water, which may be accomplished with the use of a horizontal mill, a ball mill, an attritor, or by passing the mixture through a plurality of nozzles within a liquid jet interaction chamber at a liquid pressure of about 10,000 psi to produce a uniform dispersion of the pigment particles in the aqueous carrier medium.

It is generally desirable to make the pigment dispersion in a concentrated form, which is subsequently diluted with a suitable liquid to an appropriate concentration for the desired viscosity, color, hue, density, and print area coverage for the particular applications.

The ink drop velocity, drop volume, and stream stability are greatly affected by the surface tension and the viscosity of the ink. Pigmented ink jet inks suitable for use with ink jet printers should have surface tension in the range of about 20 dyne/cm to about 80 dyne/cm, preferably 25 dyne/cm to 75 dyne/cm at 20° C. Acceptable viscosities are no greater than 20 cP, preferably in the range of about 1 cP to about 10.0 cP at 20° C.

EXAMPLES

The following examples further illustrate the invention.

Preparation of Poly(methacrylic acid [13]-β-benzyl methacrylate-co-methyl methacrylate [12]-β-ethoxytriethylene glycol methacrylate [4]), MAA//BzMA//ETEGMA:

To a solution of 46.5 g (266.5 mmol) of 1-methoxy-1-trimethylsiloxy-2-methyl-1-propene and 8.0 mL of tetrabutyl ammonium m-chlorobenzoate (1.0 M solution in acetonitrile) in 800 mL tetrahydrofuran ("THF") was slowly added 548.4 g (619.4 mL, 3.465 mol) of trimethylsilyl methacrylate over 45 minutes under a nitrogen atmosphere. The temperature rose from 26° C. to 52.3° C. during the course of the addition. After about 20 minutes, the temperature fell to 38.2° C., at which time 0.5 mL of tetrabutyl ammonium m-chlorobenzoate solution was added. No exotherm was detected. To the reaction mixture was then slowly added 608.4 g (602.4 mL, 3.198 mol) of 2-phenylethyl methacrylate (dried over molecular sieves) over 30 minutes. The temperature rose to 50.3° C. during the course of the addition. About 30 minutes later, the temperature fell to 36° C. and 0.5 mL of tetrabutyl ammonium m-chlorobenzoate was added. No exotherm was detected. To the reaction mixture was then added 265.7 g (265.7 mL, 1.066 mol) of ethoxytriethyleneglycol methacrylate (dried over molecular sieves) over 20 minutes. The temperature rose to 42.2° C. The reaction mixture was stirred for 4 hours, quenched with 400 mL of methanol and stirred overnight. The volatiles were stripped off on a rotavap under vaccuo to give 1,180 g of a white solid.

The resulting block polymer was neutralized by mixing 350 g of the polymer with 108.5 g of potassium hydroxide solution (45.6% in deionized water) and 3,041.5 g of deionized water until a homogeneous 10% polymer solution was obtained.

Preparation of pigment dispersion

A black pigment dispersion was prepared by premixing the ingrdients listed below in a plastic beaker with mechanical stirring until no lumps or dry clumps were visible. The mixture was dispersed in a microfluidizer (Microfluidics Corp., Watham, Mass.) by passing it through the interaction chamber 5 times under a liquid pressure of about 8,000 psi. The resulting pigment dispersion had a 10% pigment concentration with an average particle size of 111 nm as determined by Brookhaven BI-90 particle sizer. The dispersion was filtered through a 1 micron high efficiency filter bag (3M Filtration Products, St. Paul, Minn.). The final pH was 7.8.

| Ingredient | Amount (parts by weight) |
|---|---|
| FW18, Carbon black pigment (Degussa Corp., Allendale, NJ 07041) | 200 |
| Polymer obtained from above, (10% solution) | 1,000 |
| Deionized water | 800 |

Example 1

The above pigment dispersion concentrate was formulated with the cosolvents listed in Table 1 at a pigment loading of 4% by weight. The inks were placed into the ink reservoir of thermal ink jet pens and a solid black area was printed on Gilbert bond paper (25% cotton, Mead Co., Dayton, Ohio). The optical density was measured by a Macbeth densitomer.

Waterfastness was determined by printing a series of ⅛" (0.32 cm) solid bars with ⅜" (0.96 cm) spacings in between on Gilbert bond paper. With the print sample held at 45 degrees, 0.25 mL of water was dripped across the bars with the print sample. Ink transfer to the white spacings was measured as the water resistance.

TABLE 1

| Sample Quality | Cosolvents | O.D | Print |
|---|---|---|---|
| 1 | 2-pyrrolidone, 4% | 1.26 | Poor |
| 2 | 2-pyrrolidone, 10% | 1.20 | Poor |
| 3 | Liponic ® EG-1, 5% | 1.28 | Poor |
| 4 | Liponic ® EG-1, 8% | 1.33 | Fair |
| 5 | Diethyleneglycol, 5% Liponic ® EG-1, 5% | 1.35 | Fair |
| 6 | Liponic ® EG-1, 8% N-hydoxyethyl pyrrolidone[1], 10% | 1.42 | Excellent |
| 7 | Liponic ® EG-1, 8% N-ethyl pyrrolidone[1], 10% | 1.48 | Excellent |
| 8 | Liponic ® EG-1, 8% N-methyl pyrrolidone[1], 10% | 1.48 | Excellent |
| 9 | Liponic ® EG-1, 8% 2-pyrrolidone[1], 10% | 1.48 | Excellent |

[1]Purchased from Aldrich Chemical Co., Milwaukee, WI.

All sample inks of the invention using the cosolvent combination (Samples 6-9) produced prints with much higher optical density than all control inks using either cosolvent alone (Samples 1-4) or in combination with other type of cosolvent (Sample 5). The inks of the invention also exhibited neutral black hue and sharp edge acuity, dried fast and became 100% waterfast as soon as the inks were dry to the touch.

The stability of all sample inks was confirmed by measuring the particle size change in delta nm on a Brookhaven ® BI-90 particle sizer after the ink samples had been subjected to 4 temperature cycles, each cycle consisting of 4 hours at −20° C. and 4 hours at 70° C. The change was within experimental error for all inks.

All experimental inks were extremely friendly and reliable in terms of decap or crusting performance and smooth printing for long periods of time throughout the life of the pen.

Example 2

An ink (Sample 10) was formulated in accordance with U.S. Pat. No. 5,180,425, using poly(butyl methacrylate [10]-co-methyl methacrylate [5]-β-methyl methacrylate [10]) and a cosolvent combination of diethylene glycol, 5%, and Liponic ® EG-1, 5%. This ink and Sample 9 from above were used to print a typical text sample which contains various fonts and character sizes on a wide range of commercial papers and the print quality evaluated by an experienced 7 member panel on a scale of 1-8, with 8 being the highest. Results are reported in Table 2.

TABLE 2

| Paper | Sample 9 | Sample 10 |
|---|---|---|
| Classic Laid[a] | 7.3 | 5.9 |
| Gilbert ® Bond[b] | 7.0 | 6.0 |
| Hammermill ® Fore DP[c] | 6.7 | 5.4 |
| Ardor ® Xerocopy[d] | 7.1 | 5.4 |
| Ardor ® Bond[d] | 6.4 | 5.6 |
| Champion ® Datacopy[e] | 6.4 | 5.4 |
| Springhill ® Relay DP[c] | 6.9 | 6.1 |
| Conqueror ®[f] | 6.6 | 5.9 |
| Kymcopy Lux[g] | 7.0 | 6.4 |
| Special Copy Lux[h] | 7.1 | 6.6 |
| Multicopy ®[i] | 7.7 | 6.6 |
| MoDo Datacopy ®[j] | 6.7 | 5.6 |
| 3000 Chlorine Free ®[k] | 7.4 | 5.7 |

[a]Neenah Paper, oswell, GA
[b]Mead Corp., Menasha, WI
[c]International Paper Co. Lock Haven, PA
[d]Georgia-Pacific Corp. Nekoosa, WI
[e]Champion International Corp. Stamford, CT
[f]Wiggins Teape Paper, England
[g]Kymi Paper Mills, Ltd. Finland
[h]Papierwerke Waldhof Aschaffenberg, Germany
[i]Papyrus AB, Sweden
[j]Mo Och Domsjo AB, Sweden
[k]Papeteries de Clairefontaine, France The ink of this invention (Sample 9) obtained a significantly higher rating than the control ink (Sample 10) for the entire paper set.

Example 3

A series of inks having a pigment concentration of 4% by weight were prepared using the pigment dispersion from above and the cosolvent combinations listed in Table 3. the inks were placed into thermal ink jet pens, printed and the optical density measured as in Example 1. The results are listed in Table 3.

TABLE 3

| Sample | 2-pyrrolidone (weight %) | Liponic ® EG-1 (weight %) | Ratio | O.D. |
|---|---|---|---|---|
| 11 | 2 | 2 | 1:1 | 1.21 |
| 12 | 5 | 2 | 2.5:1 | 1.20 |
| 13 | 8 | 2 | 4:1 | 1.20 |
| 14 | 4 | 4 | 1:1 | 1.29 |
| 15 | 6 | 4 | 1.5:1 | 1.30 |
| 16 | 2 | 5 | 1:2.5 | 1.32 |
| 17 | 8 | 5 | 1.6:1 | 1.36 |
| 18 | 2 | 8 | 1:4 | 1.42 |
| 19 | 8 | 8 | 1:1 | 1.46 |
| 20 | 5 | 8 | 1:1.6 | 1.46 |
| 21 | 6 | 6 | 1:1 | 1.41 |
| 22 | 4 | 6 | 1:1.5 | 1.40 |
| 23 | 4 | 8 | 1:2 | 1.46 |

TABLE 3-continued

| Sample | 2-pyrrolidone (weight %) | Liponic ® EG-1 (weight %) | Ratio | O.D. |
|---|---|---|---|---|
| 24 | 10 | 8 | 1.25:1 | 1.48 |

All sample inks which met the requirements of this invention gave significantly higher optical density than the controls.

What is claimed is:

1. An aqueous ink jet ink composition comprising:
   (a) a pigment dispersion;
   (b) an aqueous carrier medium; and
   (c) a cosolvent combination comprising:
      (i) at least 4.5% by weight based on the total weight of the ink composition of a polyol/alkylene oxide condensate having a solubility in water of at least 4.6% at 25° C. and represented by the formula:

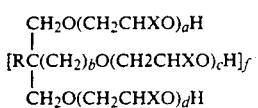

wherein X is independently —H or —CH$_3$;
R = —H, —CH$_3$, —C$_2$H$_5$, —C$_3$H$_9$, —C$_4$H$_9$, or —CH$_2$O(CH$_2$CH$_2$O)$_e$H;
b = 0 or 1;
a + d + f(c + e) = 2–100;
f = 1–6; and
      (ii) at least 2% by weight based on the total weight of the ink composition of a cyclic amide derivative having a solubility in water of at least 4.5% at 25° C. and represented by the formula:

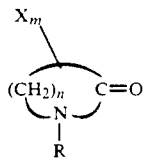

wherein n = 3–7,
R = H, or alkyl group having 1 to 4 carbon atoms, and optionally containing one or more hydroxy or ether groups,
m = 0–3,
X = alkyl group having 1 to 4 carbon atoms, and optionally containing one or more hydroxy or ether groups, and wherein X replaces a H on the ring when m = 1–3;
wherein the ratio of cosolvent (i) to cosolvent (ii) is in the range from 10:1 to 1:10 by weight.

2. The ink composition of claim 1 wherein the pigment dispersion comprises a pigment and a polymeric dispersant.

3. The ink composition of claim 2 wherein the pigment is an organic pigment present in the amount of up to about 30% based on the total weight of the ink composition.

4. The ink composition of claim 2 wherein the dispersant is present in the amount of about 0.1–25% based on the total weight of the ink composition.

5. The ink composition of claim 3 wherein the polymeric dispersant is selected from the group consisting of random, block and branched polymers.

6. The ink composition of claim 1 wherein the the ratio of cosolvent (i) to cosolvent (ii) is in the range from 4:1 to 1:4 by weight.

7. The ink composition of claim 1 or 6 wherein the cyclic amide derivative is present in the amount of about 2–25% based on the total weight of the ink composition.

8. The ink composition of claim 1 or 6 wherein the polyol/alkylene oxide condensate is present in the amount of about 4.5–25% based on the total weight of the ink composition.

9. The ink composition of claim 1 wherein a + d + f(c + e) = 10–40.

10. The ink composition of claim 1 wherein, in cosolvent (i), X = —H, R = —H, f = 1 and b = 0.

11. The ink composition of claim 1 wherein, in cosolvent (i), X = —H, R = —CH$_3$ or —C$_2$H$_5$, f = 1 and b = 1.

12. The ink composition of claim 1 wherein, in cosolvent (i), X = —H, R = —H, f = 4 and b = 0.

13. The ink composition of claim 1 wherein cosolvent (i) is the reaction product of glycerol with 26 moles of ethylene oxide.

14. The ink composition of claim 1 wherein cosolvent (i) is the reaction product of sorbitol with 20 moles of ethylene oxide.

15. The ink composition of claim 1 wherein n 3–5.

16. The ink composition of claim 1 wherein cosolvent (ii) is selected from the group of 2-pyrrolidone, 1-methyl-2-pyrrolidone, 1,5-dimethyl-2-pyrrolidone, 1-ethyl-2-pyrrolidone, 1-propyl-2-pyrrolidone, 1-isopropyl-2-pyrrolidone, 1-butyl-2-pyrrolidone, 1-(2-hydroxyethyl)-2-pyrrolidone, 1-methyl-2-piperidone, valerolactam, 1-ethyl valerolactam, caprolactam, 1-methylcaprolactam and oenantholactam.

17. The ink composition of claim 1 wherein the aqueous carrier medium comprises water or a mixture of at least one water soluble organic solvent other than cosolvent (i) or cosolvent (ii).

18. The ink composition of claim 1 wherein the aqueous carrier medium is present in the amount of about 65–93.5% based on the total weight of the ink composition.

* * * * *